United States Patent
Michaelis

(10) Patent No.: US 8,386,255 B2
(45) Date of Patent: Feb. 26, 2013

(54) PROVIDING DESCRIPTIONS OF VISUALLY PRESENTED INFORMATION TO VIDEO TELECONFERENCE PARTICIPANTS WHO ARE NOT VIDEO-ENABLED

(75) Inventor: Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 1016 days.

(21) Appl. No.: 12/405,816

(22) Filed: Mar. 17, 2009

(65) Prior Publication Data

US 2010/0241432 A1 Sep. 23, 2010

(51) Int. Cl.
G10L 13/08 (2006.01)
G10L 21/00 (2006.01)
(52) U.S. Cl. ........ 704/260; 704/270.1
(58) Field of Classification Search .......... None
See application file for complete search history.

(56) References Cited

U.S. PATENT DOCUMENTS

| | | | |
|---|---|---|---|
| 5,677,739 A * | 10/1997 | Kirkland | 348/468 |
| 5,900,908 A * | 5/1999 | Kirkland | 348/62 |
| 6,577,324 B1 * | 6/2003 | Palmer et al. | 715/705 |
| 7,305,436 B2 * | 12/2007 | Willis | 709/204 |
| 2007/0101266 A1 * | 5/2007 | Kim et al. | 715/719 |
| 2007/0230748 A1 * | 10/2007 | Foss | 382/114 |
| 2008/0114601 A1 * | 5/2008 | Boyle et al. | 704/270 |
| 2009/0083801 A1 * | 3/2009 | Hardacker et al. | 725/56 |
| 2009/0259473 A1 * | 10/2009 | Chang et al. | 704/260 |
| 2010/0174544 A1 * | 7/2010 | Heifets | 704/260 |

* cited by examiner

*Primary Examiner* — Talivaldis Ivars Smits
(74) *Attorney, Agent, or Firm* — Sheridan Ross P.C.

(57) ABSTRACT

Descriptions of visually presented material are provided to one or more conference participants that do not have video capabilities. This presented material could be any one or more of a document, PowerPoint® presentation, spreadsheet, Webex® presentation, whiteboard, chalkboard, interactive whiteboard, description of a flowchart, picture, or in general, any information visually presented at a conference. For this visually presented information, descriptions thereof are assembled and forwarded via one or more of a message, SMS message, whisper channel, text information, non-video channel, MSRP, or the like, to one or more conference participant endpoints. These descriptions of visually presented information, such as a document, spreadsheet, spreadsheet presentation, multi-media presentation, or the like, can be assembled in cooperation with one or more of OCR recognition and text-to-speech conversion, human input, or the like.

18 Claims, 2 Drawing Sheets

PROVIDING DESCRIPTIONS OF VISUALLY PRESENTED INFORMATION TO VIDEO TELECONFERENCE PARTICIPANTS WHO ARE NOT VIDEO-ENABLED

FIELD OF THE INVENTION

One exemplary aspect of the present invention is directed toward non-verbal communications. More specifically, one exemplary aspect is directed toward providing information about visually presented information in audio form to either a speaker or a listener such that they can benefit from awareness of the visually presented information.

BACKGROUND

Audio teleconferences may be supplemented with a visual channel that permits applications to be shared. Examples of products that support this capability include Webex® and Avaya Meeting Exchange®. Examples of applications that are commonly shared include MS Word®, MS PowerPoint® and whiteboards. In a similar manner, during a video conference, there may be various things presented such as exhibits, pictures, charts, graphs, drawings on a whiteboard or sketchpad, a physical object, or in general anything.

SUMMARY

One problem with this presented information is that some of the teleconference participants may be unable to see the shared visual information. Similarly, if a video conference participant has only audio conference capabilities, they may also not be able to see the shared visual information. For example, they may not have access to a PC or a video conference-enabled endpoint. They may also not have reliable Internet access. Or, they may have reliable Internet access, but may be unable to tunnel through firewalls or, the problem may be that they are blind.

There are certain automatic technologies that can provide verbal descriptions and summaries of at least some of the information that is shared visually during Webex® and meeting exchange-supplemented audio teleconferences. For example, simple text-to-speech engines can read the documents that are shared. Optical character recognition techniques can read text that is being written on whiteboards. When OCR is supplemented by image processors of greater sophistication, the shapes of objects and the structures of diagrams may be described. One exemplary aspect of the present invention utilizes these technologies to provide descriptions of shared visual information to the conference participants who are not video-enabled.

The U.S. Government's "Section 508" procurement regulations require video-intensive presentations, such as training films, to include a separate audio track that provides specialized narration for people who are visually impaired or blind. However, this audio track does not include information about visually presented information. Moreover, real-time communications do not currently convey any of the "marker or chalkboard" information unless one can see the board the communicator is using.

Accordingly, exemplary aspects of the present invention are directed toward providing descriptions of presented material to one or more conference participants. This presented material could be any one or more of a document, PowerPoint® presentation, spreadsheet, Webex® presentation, whiteboard, chalkboard, interactive whiteboard, description of a flowchart, picture, or in general any information visually presented at a conference.

Another exemplary aspect of the invention is directed toward assembling and forwarding descriptions of presented information via one or more of a message, SMS message, whisper channel, text information, non-video channel, MSRP, or the like, to one or more conference participant endpoints.

Yet another aspect of the present invention relates to providing descriptions of visually presented information, such as a document, spreadsheet, spreadsheet presentation, multimedia presentation, or the like, after one or more of OCR recognition and text-to-speech conversion, to a conference participant endpoint(s).

One exemplary method of supplying this summary of visually presented information would be a so called whisper announcement to either the listener or speaker. Another exemplary method would be to supply an audible indication when visually presented information is presented. For example, it could be, for example, a sound bite, such as "picture," a tone, or in general any audible indicator that is correlatable to a specific visually presented piece of information or combination of pieces of information.

Each of these exemplary methods has advantages in certain situations and disadvantages in others. One aspect of the system allows customization such as that the system is capable of providing whichever form is most suitable to the target device and/or the user.

The choice of the methodology used to present the descriptions of the visually presented information could similarly be done with consideration of the target device and/or the user. Examples could include using a certain indicator when the user has the ability to view their device but does not have the ability via a headset to hear a whisper announcement.

Associated with one exemplary embodiment of the present invention could be a preference file that indicates in what form a user desires to receive the visually presented information as a function of time, place, device, equipment or personal capabilities, or the like. Similarly, a speaker or presenter who desires feedback about the visually presented information they are presenting could also have a preference about how much information is provided to them. For example, if a poster presented by a speaker is not in the field of view of the camera, a whisper announcement could be relayed back to the presenter indicating that, for example, the poster needs to be moved "to the right."

Another exemplary aspect of the present invention is directed toward the detection, monitoring and analysis of one or more visually presented pieces of information in a remote location, such as a classroom. For example, if someone were to begin writing on a whiteboard, interactive whiteboard, retrieving a document, or introducing a picture or exhibit into the field of view of a video-conference camera, an indicator thereof could be provided to one or more conference participants. Additionally, the introduction of the visually presented information could dynamically trigger the appropriate analysis tool, such as OCR, text-to-speech, an image analysis module, or the like, to provide the description of the visually presented information. In accordance with yet another exemplary embodiment, there can be a plurality of participants who are not video-enabled who desire to receive an indicator of visually presented information. Thus, one or more of the participants who are not video-enabled, can have an associated profile that allows for one or more of the selection and filtering of what types of visually presented information the user will receive. In addition, the profile can specify how information relating to the descriptions of the visually presented information should be presented to the user. As discussed, this information could be presented via a text channel, via a whisper, such as in whisper channel A, while the conference continues on channel B, and a non-video channel associated with the conference and/or in an SMS message. This profile could be user-centric, endpoint-centric or associated with a conferencing system. For example, if the user is associated with either a bandwidth or processor limited-endpoint, it may be more efficient to have the profile associated with the conference system. Alternatively, or in addition, and for example, at the endpoint associated with a user is a laptop and associated webcam, one or more aspects of the profile (and functionality associated therewith) could be housed on the laptop.

Accordingly, one exemplary aspect of the invention is directed toward providing descriptions of visually presented information to non-video enabled participants.

Still another aspect of the invention is directed toward providing descriptions of visually presented information to video telephone participants who are not video-enabled.

Even further aspects of the invention are directed toward the detection and monitoring of visually presented information in a video conferencing environment.

Still further aspects of the invention are directed toward the detection of selection of an appropriate visually presented information analysis tool.

Even further aspects of the invention are directed toward a user profile that specifies one or more of the types of information to be received and the communication modality for that information.

Aspects of the invention also relate to generation and production of a transcript associated with a video conference that includes one or more of descriptions and indicators of the visually-presented information.

Yet another aspect of the present invention provides a video conference participant, such as the moderator or speaker, feedback as to the effectiveness and visibility of their visually presented information, e.g., field of view, zoom, focus, brightness, or the like.

Even further aspects of the invention relate to assessing the capabilities of one or more of the conference participants and, for each participant that is not video-enabled, associating therewith messaging preferences based on, for example, their capabilities and/or preferences.

Even further aspects of the invention relate to providing a conference transcript and the ability to adjust the granularity of a conference transcript to thereby govern what type of descriptions of visually presented information should be included therein. For example, some visually presented information, such as lengthy documents, or items that are difficult to describe, such as a multi-page complex spreadsheet, could be selected to be ignored, while on the other hand, information drawn on a whiteboard or a presented object may be desired to be captured. The documents that are not captured, if in electronic format, could be associated with the conference transcript and retrieved in their native format, for example, at a later time, via, for example, the selection of a hyperlink.

Aspects of the invention may also provide useful during interrogations, interviews, depositions, court hearings, or in general any environment in which it may be desirable to include descriptions of one or more pieces of visually presented information.

As discussed, one exemplary aspect of the invention provides audible and/or text input to conference participants who are unable to see visually presented information that one or more other conference participants may be showing. Examples of how this information could be provided include:

1. For conference participants who have a single monaural audio-only endpoint, audio descriptions of the visually presented information could be presented via a "whisper" announcement.
2. For conference participants who have more than one monaural audio-only endpoint, they could use one of the endpoints for listening to the conference discussion then utilize the other to receive audio descriptions of the visually presented information.
3. Conference participants who have a binaural audio-only endpoint could use one of the channels for listening to the conference discussions, and utilize the other to receive audio descriptions of one or more visually presented pieces of information.
4. Conference participants who have an audio endpoint that is email capable, SMS capable, or IM capable could receive descriptions of the visually presented information via these respective interfaces.
5. Conference participants who have an audio endpoint that is capable of receiving and displaying streaming text (illustratively, a SIP endpoint that supports IETF recommendation RFC-4103, "RTP payload for text conversation") can have the description scroll across the endpoint's display, such that the text presentation is synchronized with the spoken information on the conference bridge.

The present invention can provide a number of advantages depending on the particular configuration. These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like.

While circuit or packet-switched types of communications can be used with the present invention, the concepts and techniques disclosed herein are applicable to other protocols.

Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be described below in relation to a communications environment, such as a video conferencing environment. Although well suited for use with circuit-switched or packet-switched networks, the invention is not limited to use with any particular type of communications system or configuration of system elements and those skilled in the art will recognize that the disclosed techniques may be used in any application in which it is desirable to provide secure feature access. For example, the systems and methods disclosed herein will also work well with SIP-based communications systems and endpoints. Moreover, the various endpoints described herein can be any communications device such as a telephone, speakerphone, cellular phone, SIP-enabled endpoint, softphone, PDA, conference system, video conference system, wired or wireless communication device, or in general any communications device that is capable of sending and/or receiving voice and/or data communications.

The exemplary systems and methods of this invention will also be described in relation to software, modules, and associated hardware and network(s). In order to avoid unnecessarily obscuring the present invention, the following description admits well-known structures, components and devices that may be shown in block diagram form, are well known, or are otherwise summarized.

For purposes of explanation, numerous details are set forth in order to provide a thorough understanding of the present invention. It should be appreciated however, that the present invention may be practiced in a variety of ways beyond the specific details set forth herein.

Figure 1:
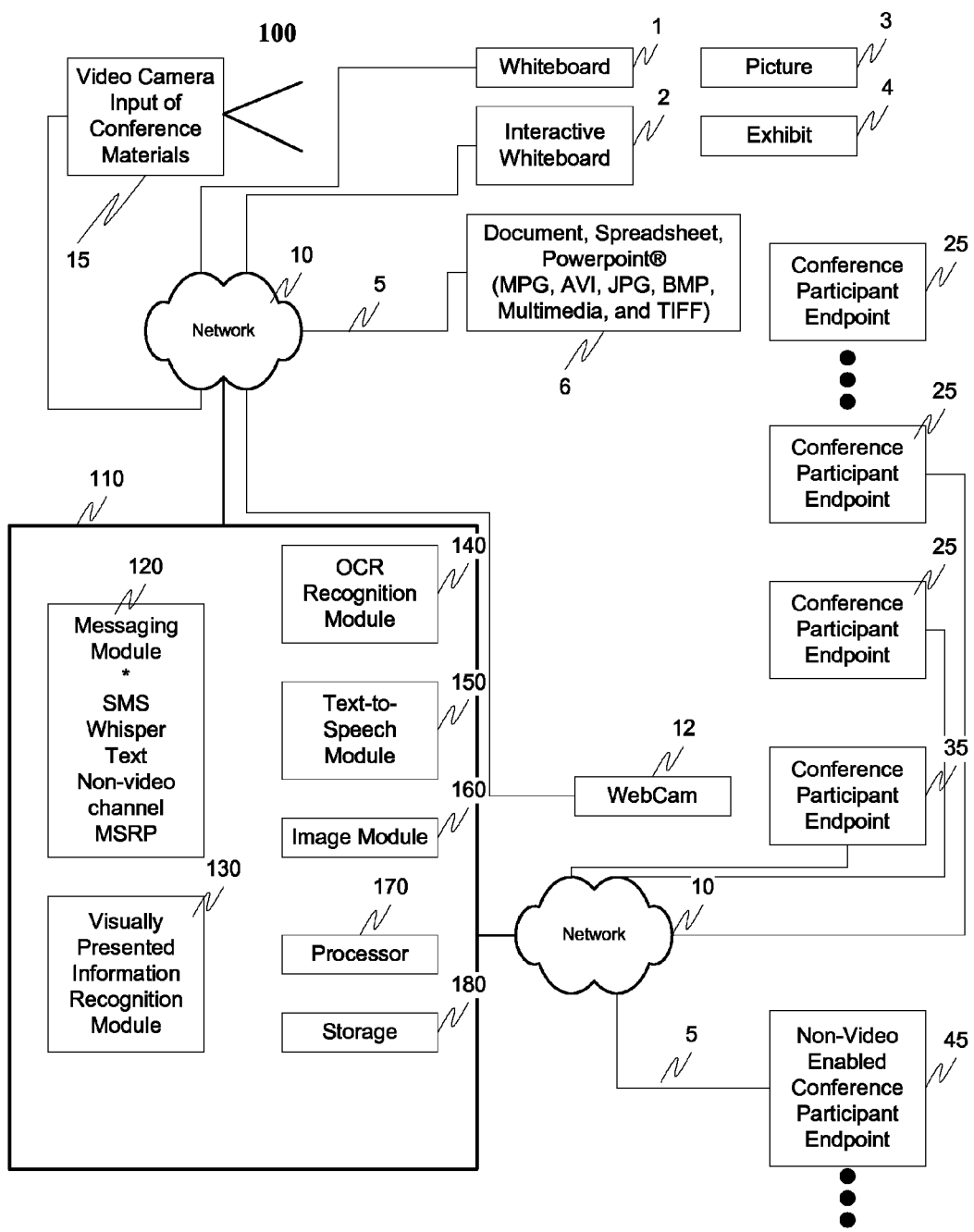
FIG. 1 illustrates an exemplary communications environment according to this invention.

FIG. 1 illustrates an exemplary communications environment 100 according to this invention. In accordance with this exemplary embodiment, the communications environment 100 enables video conferencing between a plurality of endpoints (25, 35, 45). More specifically, communications environment 100 includes a conferencing module 110, and one or more networks 10, and associated links 5, connected to a video camera 15 viewing one or more visually presented pieces of information such as from the whiteboard 1, picture 3, exhibit 4 and interactive whiteboard 2. It should further be appreciated that the interactive whiteboard 2 may have the capability for electronic capturing of information drawn thereon that could optionally or additionally be provided via network 10 and one or more links 5, to the conferencing module 110. In a similar manner, information such as documents, spreadsheets, spreadsheets, multimedia presentation, PDF presentations, and the like could be provided directly via a network 10 and one or more links 5 to the conference module 110 and/or captured by the video camera 15 and provided to the conference module 110. Exemplary communications environment 100 could also include a webcam 12, associated with conference participant at a conference participant endpoint 35, and one or more non-video enabled conference participant endpoints 45, connected via one or more networks 10 and links 5 to the conference module 110. The non-video enabled conference participant endpoints 45 may be non-video enabled for any number of reasons. For example, they may not be able to receive video due to hardware limitations, a firewall(s) or some other limitation. They may also be non-video enabled not because of hardware or other limitations, but rather because the user elected not to receive video of this particular conference.

The conference module 110 includes a messaging module 120, a visually presented information recognition module 130, an OCR recognition module 140, a text-to-speech module 150, an image module 160, a processor 170 and storage 180. The conferencing module 110 can also include other standard conference bridge componentry which will not be illustrated for sake of clarity.

In operation, a video conference is established with the cooperation of the conference module 110. For example, video camera 15, which may have an associated audio input and presentation equipment, such as a display and loudspeaker, could be associated with conference participant 25. Webcam 12 is provided for a conference participant at conference participant endpoint 35 with audio and video therefrom being distributed to the other conference endpoints. Similarly, the webcam 12 could be enabled to capture visually presented information which could then be processed in a similar manner to the visually presented information provided to video camera 15. The non-video enabled conference participants at non-video enabled conference participant endpoints 45, either because of endpoint capabilities or user impairment(s), are not able to receive or view video content from the other participants. The capabilities of these various endpoints can be registered with the conference module 110, and in particular the messaging module 120, upon initiation of a video conference. Alternatively, the messaging module 120 can interrogate one or more of the endpoints and determine the endpoint's capabilities, and/or the capabilities of the user based on, for example, a users profile associated with the endpoint. In addition, one or more of each endpoint and/or user associated with each endpoint may have a profile that not only specifies the capabilities of the endpoint, but also messaging preferences. As discussed, these messaging preferences can include the types of information to be received as well as how that information should be presented. As discussed hereinafter in greater detail, the messaging module 120 forwards this information via one or more of the requested modalities to one or more of the conference endpoints. It should be appreciated that while the messaging module 120 will in general only send the description information to non-video enabled conference participants, this messaging could in general be sent to any conference participant, such as the example discussed above when providing feedback to a presenter.

Even though not illustrated, the communications environment, and in particular the conference module 110, could include a transcript module, that cooperates with one or more of the processor 170 and storage 180 that could be enacted upon the commencement of a video conference to create a conference transcript that includes one or more of the following pieces of information: participant information, description of visually presented information, timing information, and in general any information associated with the video conference and/or one of the described modules. The conference transcript can be conference-participant centric or, a "master" conference transcript that is capable of capturing and memorializing any one or more of the aspects of the video conference. Furthermore, associated with the conference transcript can be one or more electronic versions of visually presented information, such as a document, spreadsheet, PowerPoint®, multimedia presentation, image file, or the like, that could be opened for viewing and/or analysis at a later time.

Upon commencement of an exemplary video conference, the conferencing module 110 in cooperation with the messaging module 120, can assess the capabilities of meeting participants via one or more of interrogation and/or greeting and the getting of a profile associated with that endpoint and/or user. Then, for each meeting participant that is not video enabled, the messaging preferences, capabilities and preferences can be determined. The conference then starts, taking into account these preferences and messaging capabilities.

Upon commencement of an exemplary video conference, one or more of the video-enabled participants are monitored and one or more of visually presented information and electronic documents is recognized. As the conference proceeds, one or more of video camera 15 and web camera 12 are monitored, to determine whether visually presented information is being presented. In a similar manner, the messaging module 120 monitors whether electronic information, such as a document, spreadsheet, or the like, is presented. Upon the determination that the visually presented information has been presented, the visually presented information is analyzed in cooperation with the visually presented information recognition module 130. Upon the visually presented information recognition module determining the type of visually presented information, such as a document, writing on a whiteboard, picture, exhibit, or the like, visually presented information recognition module 130 cooperates with one or more of the OCR recognition module 140, text-to-speech module 150 and image module 160, along with the processor 170 and storage 180 as appropriate. Thus, for example, if the visually presented information is writing on a whiteboard 1, the visually presented information recognition module 130 can cooperate with the OCR recognition module 140 to determine what has been written. Similarly, if the visually presented information is a picture 3, the visually presented information recognition module 130 can cooperate with the image module 160 to provide a description thereof. For example, the picture 3 could be compared to known pictures having a similar content for which a description is available, and that description provided to the user. Similarly, the image module 160 could cooperate with the OCR recognition module 140 to assist with determining the content of the picture.

For example, a user could be drawing something on a white board and simultaneously describing what they are drawing. For example, as a user draws, the user draws a "stick figure" that is supposed to look like a person using a phone, the user could be saying something like, "and here is a person who is using the phone." The image module 140 could track what the user is saying while they are drawing. This could then in turn be used in a couple of different ways. For example:

"The picture that had been identified as 'a person who is using the phone' has been erased."

"A picture similar to one that had been described earlier as 'a person who is using the phone' has been added, along with some additional information."

In general any technology used for image recognition could be used with the image module and the systems and methods of this invention.

Should the presented information be information such as a document 6, the text-to-speech module 150 can translate this information to speech. Regardless of the type of description assembled by the visually presented information recognition module 130, this description can be provided via the messaging module 120 to one or more of the conference participant endpoints as described. In addition, the descriptions of these various types of visually presented information can be logged and recorded in one or more conference transcripts.

Figure 2:
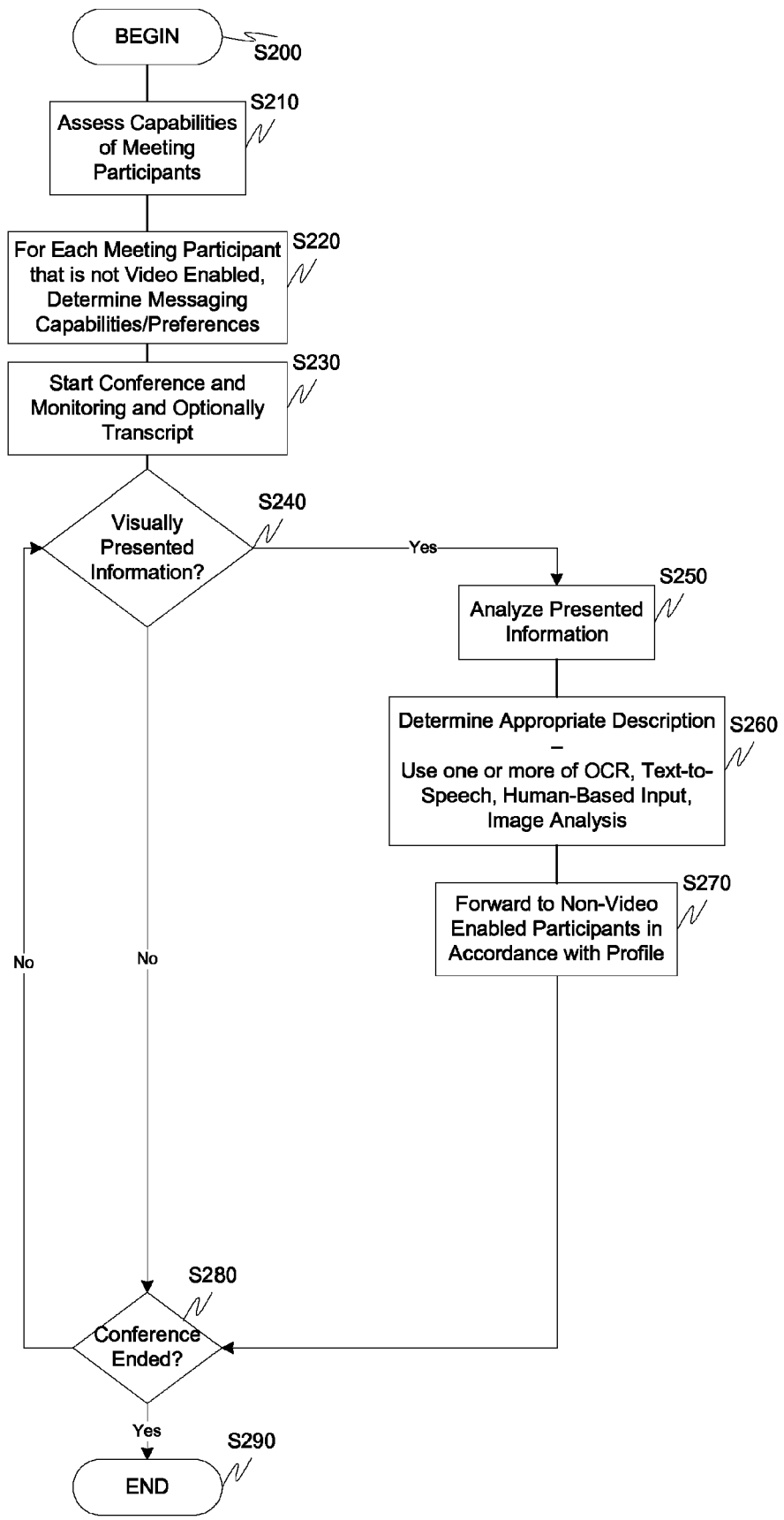
FIG. 2 illustrates an exemplary method for providing descriptions of visually presented communications to conference participants who are not video-enabled according to this invention.

FIG. 2 outlines an exemplary methodology for providing descriptions of visually presented information according to this invention. In particular, control begins in step S200 and continues to step S210. In step S210, the capabilities of one or more of the meeting participants and/or endpoints are determined. Next, in step S220, for each meeting participant that is not video-enabled, the messaging capabilities/preferences for that endpoint/user are determined. Then, in step S230, the video conference is started in conjunction with optionally creating a transcript thereof. Control then continues to step S240.

In step S240, a determination is made whether visually presented information has been presented. If visually presented information has been presented, control continues to step S250 with control otherwise jumping to step S280. For example, this can be based on one or more of a scene change, the accessing of a file(s), recognition of a presenter pointing at an object, or the like.

In step S250, the visually presented information is analyzed. For example, a first determination can be what type of visually presented information has been presented, e.g., picture, exhibit, document or the like. Next, in step S260, and optionally based on the analysis step, the appropriate action is dynamically chosen for providing a description of the visually presented information. As discussed, this can be based on one or more of OCR, text-to-speech, human-based input, image analysis, or in general any analysis as appropriate for visually presented information.

For example, for electronically presented information, information such as the filename extension can be analyzed. The analysis of the filename extension can be correlated to a table of known file name extensions and the type of information determined, e.g., ".doc" is a document, ".ppt" a spreadsheet, ".jpg" and image, and the like. This can then be used to assist with describing the presented information and optionally used to assist with determining what is the appropriate analysis tool for the presented information. For pictures and exhibits, a screen capture of the presented information could be performed, then in cooperation with, for example, human-based input, a description of the visually presented information assembled.

Then, in step S270, the description of the visually presented information is forwarded to one or more of the non-video enabled participants in accordance with their profile, and in general to any conference participant as discussed. Furthermore, if the conferencing system is maintaining a transcript of the conference, this information can be recorded in the transcript along with other information, such as the actual audio and video of the conference, and in general any information associated with a conference. Control then continues to step S280 where a determination is made whether the conference has ended. If the conference has not ended, control jumps back to step S240. Otherwise, control continues to step S290 where the control sequence ends.

A number of variations and modifications of the invention can be used. It would be possible to provide or claims for some features of the invention without providing or claiming others.

The exemplary systems and methods of this invention have been described in relation to enhancing video conferencing. However, to avoid unnecessarily obscuring the present invention, the description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show various components of the system collocated, certain components of the system can be located remotely, at distant portions of a distributed network, such as a LAN, cable network, and/or the Internet, or within a dedicated system. Thus, it should be appreciated, that the components of the system can be combined in to one or more devices, such as a gateway, or collocated on a particular node of a distributed network, such as an analog and/or digital communications network, a packet-switch network, a circuit-switched network or a cable network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, a cable provider, enterprise system, in one or more communications devices, at one or more users' premises, or some combination thereof. Similarly, one or more functional portions of the system could be distributed between a communications device(s) and an associated computing device.

Furthermore, it should be appreciated that the various links, such as link 5, connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention.

Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A method for providing non-video communications to non-video enabled video conference participants comprising:
   recognizing visually presented information at a conference module;
   the conference module determining information describing the visually presented information; and
   forwarding by the conference module, based on preference information, the information describing the visually presented information to one or more destinations, wherein the one or more destinations are non-video enabled conference endpoints, wherein video content is not provided to at least a first one of the conference endpoints, and wherein the visually presented information is obtained from at least a second one of the conference endpoints.

2. The method of claim 1, further comprising utilizing one or more of Optical Character Recognition (OCR) and text-to-speech conversion to determine the information describing the visually presented information.

3. The method of claim 1, further comprising recognizing when visually presented information is presented.

4. The method of claim 1, further comprising forwarding the visually presented information to an interpreter for determining of the information describing the visually presented information.

5. The method of claim 4, wherein the interpreter is a human.

6. The method of claim 1, further comprising generating a transcript including the information describing the visually presented information.

7. The method of claim 1, where the information describing the visually presented information is display by at least one of the conference endpoints as streaming text.

8. The method of claim 1, further comprising associating a profile with a video conference, the profile specifying that one or more types of the visually presented information are to be described and specifying the modality for providing the description.

9. The method of claim 1, further comprising:
   for conference participants who have a single monaural audio-only endpoint, providing the information describing the visually presented information as an audio description via a "whisper" announcement;
   for conference participants who have more than one monaural audio-only endpoint, using one of the endpoints for listening to a conference and utilizing the other endpoint to receive audio descriptions of the information describing the visually presented information;
   for conference participants who have a binaural audio-only endpoint, using one of the channels for listening to conference discussions, and utilizing the other endpoint to receive audio descriptions of the information describing the visually presented information;
   for conference participants who have an audio endpoint that is email capable, SMS capable, or IM capable, sending the information describing the visually presented information via one or more of these respective interfaces; and
   for conference participants who have an audio endpoint that is capable of receiving and displaying streaming text, scrolling the describing information across an endpoint's display.

10. A computer-readable storage media having stored thereon instructions that, when executed, perform the steps of claim 1.

11. One or more means for performing the steps of claim 1.

12. A system that provides non-video communications to non-video enabled video conference participants comprising:
   a visually presented information recognition module provided as part of a conference module that recognizes visually presented information;

a messaging module provided as part of a conference module that determines information describing the visually presented information and forwards, based on preference information, the describing information to one or more destinations, wherein the one or more destinations are non-video enabled conference endpoints, wherein the conference endpoints present the information describing the visually presented information, wherein at least a first one of the conference endpoints is not provided with video content, and wherein the visually presented information is provided to the conference module by at least a second one of the conference endpoints.

13. The system of claim 12, further comprising utilizing one or more of an Optical Character Recognition (OCR) module and text-to-speech conversion module to determine the describing information.

14. The system of claim 12, wherein the visually presented information recognition module dynamically determines when visually presented information is presented.

15. The system of claim 12, further comprising an interpreter that assembles the describing information.

16. The system of claim 15, wherein the interpreter is a human.

17. The system of claim 12, wherein a profile is associated with a video conference, the profile specifying one or more types of the visually presented information are to be described and the modality for providing the description.

18. The system of claim 12, wherein the messaging module:
for conference participants who have a single monaural audio-only endpoint, provides the describing information as audio descriptions via a "whisper" announcement;
for conference participants who have more than one monaural audio-only endpoint, uses one of the endpoints for listening to a conference and utilizes the other endpoint to receive audio descriptions of the describing information;
for conference participants who have a binaural audio-only endpoint, uses one of the channels for listening to conference discussions, and utilizes the other endpoint to receive audio descriptions of the describing information;
for conference participants who have an audio endpoint that is email capable, SMS capable, or IM capable, sends the describing information via one or more of these respective interfaces; and
for conference participants who have an audio endpoint that is capable of receiving and displaying streaming text, scrolls the describing information across an endpoint's display.

* * * * *

UNITED STATES PATENT AND TRADEMARK OFFICE
CERTIFICATE OF CORRECTION

PATENT NO. : 8,386,255 B2  
APPLICATION NO. : 12/405816  
DATED : February 26, 2013  
INVENTOR(S) : Paul Roller Michaelis Page 1 of 1

It is certified that error appears in the above-identified patent and that said Letters Patent is hereby corrected as shown below:

In the Claims:

Column 12, line 27, please delete "display" and insert --displayed--.

Signed and Sealed this
Twenty-third Day of July, 2013

Teresa Stanek Rea
*Acting Director of the United States Patent and Trademark Office*